United States Patent [19]
Clapper, Jr.

[11] Patent Number: 5,609,337
[45] Date of Patent: Mar. 11, 1997

[54] GAMING TICKET DISPENSER APPARATUS AND METHOD OF PLAY

[76] Inventor: Ronald C. Clapper, Jr., 20753 Horace St., Chatsworth, Calif. 91311

[21] Appl. No.: 500,053

[22] Filed: Jul. 10, 1995

Related U.S. Application Data

[63] Continuation-in-part of Ser. No. 999,268, Nov. 16, 1992, Pat. No. 5,377,975, which is a continuation-in-part of Ser. No. 879,747, May 6, 1992, Pat. No. 5,348,299.

[51] Int. Cl.$^6$ .................. A63F 9/24; A63F 3/06
[52] U.S. Cl. .................. 273/138.2; 273/143 R; 273/139; 235/381; 463/16; 463/17
[58] Field of Search ................ 273/138.2, 139, 273/138.1, 193 R; 235/381; 463/16, 17

[56] References Cited

U.S. PATENT DOCUMENTS

| | | | |
|---|---|---|---|
| 4,689,742 | 8/1987 | Troy et al. | 364/412 |
| 4,839,507 | 6/1989 | May | 235/381 |
| 4,842,278 | 6/1989 | Markowicz | 273/138 A |
| 4,896,791 | 1/1990 | Smith | 221/7 |
| 5,039,848 | 8/1991 | Stoken | 235/381 |
| 5,290,033 | 3/1994 | Bittner et al. | 273/138 A |

*Primary Examiner*—Benjamin H. Layno
*Attorney, Agent, or Firm*—Robert J. Schaap

[57] ABSTRACT

An electronic gaming apparatus which preferably corresponds to and effectively electronically automates games of chance as, for example, that game of chance known as "Pull-Tab." The apparatus is generally played by a single player and is designed to dispense a ticket containing indicia thereon. If the indicia which appears on the ticket constitutes winning or scoring indicia, the player obtains a reward as, for example, a pay-off in money. Only a limited number of the tickets contain any winning or scoring indicia. All tickets are pre-printed and may be dispensed from a bin containing pre-cut tickets. Otherwise, the tickets may be severed from a strip in the form of a roll containing all of the tickets sequentially. The apparatus comprises a display means which displays each of the indicia on a ticket. The display is operated in a manner so that the indicia are effectively scrolled across the display screen to generate an image of rotating wheels which display the indicia. In one embodiment, the display actually constitutes rotating wheels with the indicia printed on the annular surfaces thereof. In another embodiment, the indicia is generated by a raster pattern screen and where the indicia are caused to move across a screen in a manner as though it creates the image of indicia being on rotating wheels. A method of distributing pre-printed rolls of tickets is provided such that each player of the gaming apparatus plays against every other player and not just the gaming apparatus.

46 Claims, 7 Drawing Sheets

GAMING TICKET DISPENSER APPARATUS AND METHOD OF PLAY

This application is a continuation-in-part of my U.S. patent application Ser. No. 999,268, filed Nov. 16, 1992 for Electronic Gaming Apparatus and Method (now U.S. Pat. No. 5,377,975, dated Jan. 3, 1995) and which was, in turn, a continuation-in-part of my U.S. patent application Ser. No. 879,747, filed May 6, 1992 (now U.S. Pat. No. 5,348,299, dated Sep. 20, 1994 for Electronic Gaming Apparatus).

BACKGROUND OF THE INVENTION

1. Field Of the Invention

This invention relates in general to certain new and useful improvements in electronic gaming apparatus and a method of playing a game of chance and, more particularly, to a gaming apparatus which is capable of dispensing tickets containing indicia and displaying on a monitor indicia corresponding to that contained on the dispensed ticket by scrolling the indicia across the monitor.

2. Brief Description of Related Art:

With the recent advances in electronic circuitry, there have been many attempts to automate games and particularly, games of gambling which were heretofore played with little or no electronic game operation. These attempts to automate games have become even more pronounced in view of the recent advances in miniature microprocessor technology.

One of the games, for example, which was previously played without any type of electronic interaction was the game of poker. This necessarily involved a dealer and a plurality of players utilizing playing cards. Recently, however, the game of poker has been automated and can literally be played by actuating selected combinations of push buttons on an electronic gaming device which includes a display screen. Other games involving playing cards, e.g. the game of Keno, have also been automated so as to enable playing on an electronic game apparatus of this type.

In the conventional game of Pull-Tab, frequently played in gaming establishments, a large number of cards, or similar substrates, are located in a box or other open container. Each of the cards are printed with some type of indicia which may be a number, a symbol or the like and only a limited number of the cards in this box or other container have a winning indicia. Each of the indicia are covered by a removable cover sheet having a tab thereon and hence, the cards are referred to as "Pull Tabs."

A dealer, upon appropriate payment by a player, will remove one of the cards from the container and provide the same to a player. Since the indicia are covered by the removable cover sheet, and since the card with winning indicia are randomly located within the container, neither the dealer nor the player know if the player is receiving a card with a winning indicia until such time as the tab is engaged and the cover sheet is removed.

In Class II gaming a certain amount of limited gaming activity is permitted. In Class III gaming activities, true games of chance are based on a randomly generated score of an apparatus [This doesn't make sense, it needs something here]are permitted and are only available in a limited number of jurisdictions in the United States. However, presently, there is also no prior art gaming device which is capable of operating as a so-called "Class II" gaming apparatus, when operated under certain conditions, e.g. along with another specific gaming activity, but which has the enhanced appeal of the so-called "Class III" gaming apparatus and still enables play of only a Class II game, e.g. a pull-tab dispensing game. A gaming apparatus which could operate on the basis of a Class II gaming activity, as described above, but which generates responses similar to, a Class III gaming apparatus, is highly desirable.

The present invention relies on an innovation which electronically enhances this game of Pull Tab and other similar games which utilize selection of randomly arranged tickets having indicia thereon. The present invention is also applicable to the automating of various other types of games, including games of playing cards, as hereinafter described, and is particularly adaptable to games which have a plurality of tickets or substrates bearing indicia thereon in the nature of playing cards or the cards used in a game of chance.

OBJECTS OF THE INVENTION

It is therefore, one of the primary objects of the present inventions to provide an electronic gaming apparatus which is capable of dispensing tickets which all contain indicia and yet only a limited, but predetermined, number of tickets contain winning indicia or scoring indicia.

It is another object of the present invention to provide an electronic gaming apparatus capable of dispensing playing tickets and where all of the tickets will contain indicia and with only a specified number of the tickets in a lot containing winning indicia such that a player of the game plays against not only the gaming apparatus, but against each other player who may play the gaming apparatus, or other gaming apparatus, which use tickets contained in a lot thereof.

It is another important object of the present invention to provide a gaming apparatus of the type stated in which a display member on the apparatus displays the indicia on a dispensed ticket in such a manner as though the indicia is on rotating wheels or appears to be on rotating wheels.

It is yet another object of the present invention to provide a gaming apparatus of the type stated in which a code associated with the ticket is read and converted into signals capable of either generating a display on a computer monitor in a form in which the display appears to be rotating wheels or otherwise which generate signals causing rotating of actual gaming apparatus wheels.

It is a further object of the present invention to provide a gaming apparatus which automates and provides security in a game of chance previously played with a plurality of playing tickets in a container and adapted for dispensing from the container.

It is also an object of the present invention to provide a gaming apparatus of the type stated which is highly effective and secure for automating and playing the game known as "Pull Tab".

It is an additional object of the present invention to provide a gaming apparatus of the type stated which can be constructed at a relatively low cost and which is highly adaptable for the playing of a number of games which heretofore were played in a non-automated fashion.

It is another salient object of the present invention to provide a gaming apparatus of the type stated which enables a play of a game involving a betting activity and which is based only on the automation of a previously existing game which does not at the time of play involve random selection in the gaming electronics but only in the dispensing of pre-printed dispensable tickets and thereby enables the play of a game in many locations where other forms of gaming activities are prohibited.

It is an additional object of the present invention to provide a method of automating a game previously played with playing pieces or substrates dispensed from an open container.

It is still another object of the present invention to provide a method of playing a game involving the dispensing of a ticket containing indicia and where only a limited number of the tickets contain winning indicia.

With the above and other objects in view, my invention resides in the novel features of form, construction, arrangement and combinations of parts presently described and pointed out in the claims.

BRIEF SUMMARY OF THE INVENTION

The present invention relates to an electronic gaming apparatus, which in a broad aspect, is capable of dispensing a gaming ticket containing indicia thereon upon actuation of the apparatus. As indicated previously, a large number of tickets are available in the apparatus and only a limited number of these tickets contain winning or scoring indicia. Furthermore, the tickets containing the winning or scoring indicia are randomly distributed throughout the large group of tickets.

All of the tickets used in the gaming apparatus of the present invention are pre-printed with the indicia thereon. In one embodiment of the invention, the tickets are pre-cut, that is, they are individual tickets which contain the indicia and which may be dispensed from a holder of a large number of these tickets. In another embodiment, the ticket may be severed from a roll or strip containing ticket segments thereon. Apparatus of each of these types are hereinafter described in more detail.

In one embodiment, the electronic gaming apparatus contains a primary strip which can be subdivided into individual segments and where each segment contains the indicia thereon. This strip of segments may be in the form of a roll containing the segments and where each segment is capable of being separated from the roll and dispensed. The apparatus also comprises a duplicate or secondary strip covering the indicia such that the indicia is not viewable until the cover strip is removed.

The apparatus further comprises means for severing a segment of the primary strip and dispensing the same upon actuation of the apparatus. In addition, a separate means for dispensing is provided which dispenses the substrate segment or so-called "game card" or "ticket".

The electronic gaming apparatus is also capable of dispensing a segment of a strip containing indicia thereon and which displays the indicia of the dispensed segment. This embodiment of the apparatus further includes a means for severing a segment of a primary strip and dispensing the same upon actuation of this apparatus. Further, the apparatus includes means for displaying the indicia on the dispensed segment.

In this latter embodiment of the apparatus, there is provided a display monitor on the apparatus for displaying the indicia. A code corresponding to the indicia is imprinted on the ticket which contains the indicia or on the secondary strip and the apparatus includes a scanning means for scanning the code and for conversion, of the code to enable a display of the indicia.

In a more specific form, the electronic gaming apparatus is constructed so that a player may win or lose based on the indicia on the dispensed substrate or substrate segment such that if the indicia corresponds to a winning indicia, the player will win. In like manner, if the indicia on the dispensed substrate strip do not correspond to the winning indicia, on a flare on the machine, e.g. a pay scale on the machine, the player will lose. Thus, the player may actuate the apparatus on numerous occasions in order to enable dispensing strip segments or tickets containing indicia to increase the probability of obtaining a ticket containing a winning indicia.

On each occasion, the player is usually required to deposit the necessary amount of money in order to actuate the apparatus and thereby play the game. For this latter purpose, the gaming apparatus will be provided with a money-receiving mechanism which will read the money and permit actuation of the game if a proper amount of money has been so deposited. In like manner, the money mechanism may be in the form of a conventional coin mechanism if the game is to be played with coins, or in the form of a bill-reading and accepting mechanism if the game is to be played with paper currency denominations.

Each of the tickets which are dispensed will contain a code representative of the indicia on that ticket, as aforesaid. This code is preferably in the form of a bar code and it is only machine readable. In other words, one viewing the code would not be able to determine what indicia exists on the ticket without otherwise looking at the indicia and in essentially all cases, the indicia are covered by a removable cover strip. The bar code is printed on the rear surfaces of the pre-cut tickets.

The gaming apparatus of the present invention also includes a display means for displaying the indicia which appears on the ticket, as aforesaid. Moreover, the indicia are displayed in precisely the same locations and arrangement as they appear on the ticket. In one of the unique and one of the unique aspects of the invention, the display operates much in the same manner as that used in the so-called conventional slot machine gaming apparatus. In other words, the indicia, such as icons, will move across the display member much in the same manner as they do in the slot machine gaming apparatus.

In one preferred embodiment of the invention, the display means actually constitutes rotating wheels of the type often used in the slot machine gaming apparatus. These wheels will have the indicia printed on the annular peripheral surface of the wheels or disks. A conventional mechanism is provided for causing these disks or wheels to rotate and stop at the selected indicia which appear on the face of the ticket.

In another embodiment of the invention, the display member is a raster pattern screen such as that used in a computer monitor. In this case, the display member operates in conjunction with a microprocessor which will cause a display of the indicia to appear as though they are on spinning wheels or disks. In either embodiment, the effect achieved by displaying the indicia in this fashion is that the player is actually only playing a Class II game, but because of the enhanced response of the apparatus, the player can obtain the enjoyment of a Class III game of chance. The response, however, does not change the fact that the player is playing a Class II gaming apparatus.

As also indicated previously, one embodiment of the apparatus operates with pre-cut individual tickets. In this case, the tickets are dispensed from a hopper containing a stack of the tickets. Again, those tickets having the winning indicia would be randomly distributed throughout this stack of tickets. Upon actuation of the gaming apparatus, an individual ticket is released from the hopper containing the tickets and moved to a conveyor where it is then deposited in a dispensing tray. In this case, the individual ticket is also preferably provided with a removable cover sheet. In this way, if the cover sheet is removed prior to use by a player, that is an indication that someone improperly or unauthorizedly examined that particular ticket. Moreover, it precludes anyone from stacking the tickets to know the location of those tickets containing the winning or scoring indicia.

As also indicated previously, the present invention can also provide individual tickets from a long strip or roll of these tickets. The tickets exist on this strip or roll as segments which can be severed from the ends of the roll and dispensed. In this embodiment of the invention, the ticket is located on a primary strip and is provided with a secondary strip disposed over the face of the primary strip having the indicia thereon.

In the preferred embodiment of the invention, essentially all of the tickets used in this gaming apparatus are pre-printed. The use of these pre-printed tickets is one of the important factors which distinguishes and allows the play of a Class II activity without true random selection of a Class III gaming activity. However, it is possible to construct the apparatus of the present invention with a printing mechanism which can print tickets on a randomized basis during the course of the play, although this type of apparatus is not preferred in the present invention. Thus, in the Class II gaming activity of the type with which the apparatus of the invention is preferably used, the apparatus itself does not actually control the outcome of the game as to whether or not a player is a winner. This is actually determined by the location of the ticket containing the winning indicia in a roll or stack of the tickets and thus, the gaming apparatus of the invention merely dispenses but does not control whether or not a player will win or score in a gaming activity.

It can be observed that the gaming apparatus of the present invention is highly effective in enabling the playing of the game of Pull-Tab. In accordance with the conventional game, cards or tickets or other substrates are pulled from a box by a dealer and with each substrate containing an indicia thereon. The indicia which correspond to winning indicia are randomly located throughout this container. In like manner, in the present invention, it can be seen that the indicia corresponding to winning indicia are randomly located. Thus, when a player of the game actuates the apparatus to cause the dispensing of a ticket, this is equivalent to the pulling of a ticket from an open container.

While the present invention is highly effective in enabling the play of the game of Pull-Tab, it is also not so limited. The gaming apparatus of the invention is essentially effective in the play of various games, whether or not gaming games, which operate on the basis of dispensing of a substrate, as for example, playing cards or the like. If desired, the apparatus can also be constructed to maintain a duplicate record so that the players themselves can actually examine the record in order to determine what transactions have taken place and to maintain a written memorialization thereof. Further, this gaming apparatus also automatically provides a display so that all members playing the game can observe the display. For this purpose, the display may be interrupted if desired, particularly if it is necessary to maintain in confidence the indicia on the ticket dispensed to any one player.

In all embodiments of the invention, the electronic gaming apparatus is highly effective in that it has the so-called "play and feel" of a true game of chance gaming apparatus, or so-called "Class III" gaming apparatus but the response does not change the fundamental fact that the apparatus only enables a play of a Class II game. This enhanced response is due to the fact that the invention provides a display which is very similar to the spinning wheels used in the conventional slot machine gaming apparatus. The apparatus also has lights and sound mechanisms which approximate those used on a Class III gaming apparatus. Moreover, the apparatus of the invention would be similarly provided with the bells or other response generating devices of the type used in other gaming apparatus.

The present invention is also unique in that it presents a distribution method which allows each of the players of a gaming apparatus to play against all other players of the gaming apparatus. This involves distribution of a selected numbers of rolls of tickets to each gaming location and where each of the selected number of tickets will contain a predetermined number of tickets having winning indicia. This type of distribution actually promotes the play of the gaming activity itself and moreover maintains play of a Class II gaming activity as opposed to the randomized winning of a Class III gaming activity.

The present invention thereby provides a unique and novel electronic gaming apparatus which satisfies and fulfills all of the above-identified objects and other objects which will become more fully apparent from a consideration of the forms in which the gaming device may be embodied. One of these forms is more fully illustrated in the accompanying drawings and described in the following detailed description of the invention. However, it should be understood that the accompanying drawings and the detailed description are set forth only for purposes of illustrating the general principles of the invention and are not to be taken in a limiting sense.

BRIEF DESCRIPTION OF THE DRAWINGS

Having thus described the invention, reference will now be made to the accompanying drawings (four sheets) in which:

DETAILED DESCRIPTION OF A PREFERRED EMBODIMENT

Figure 1:
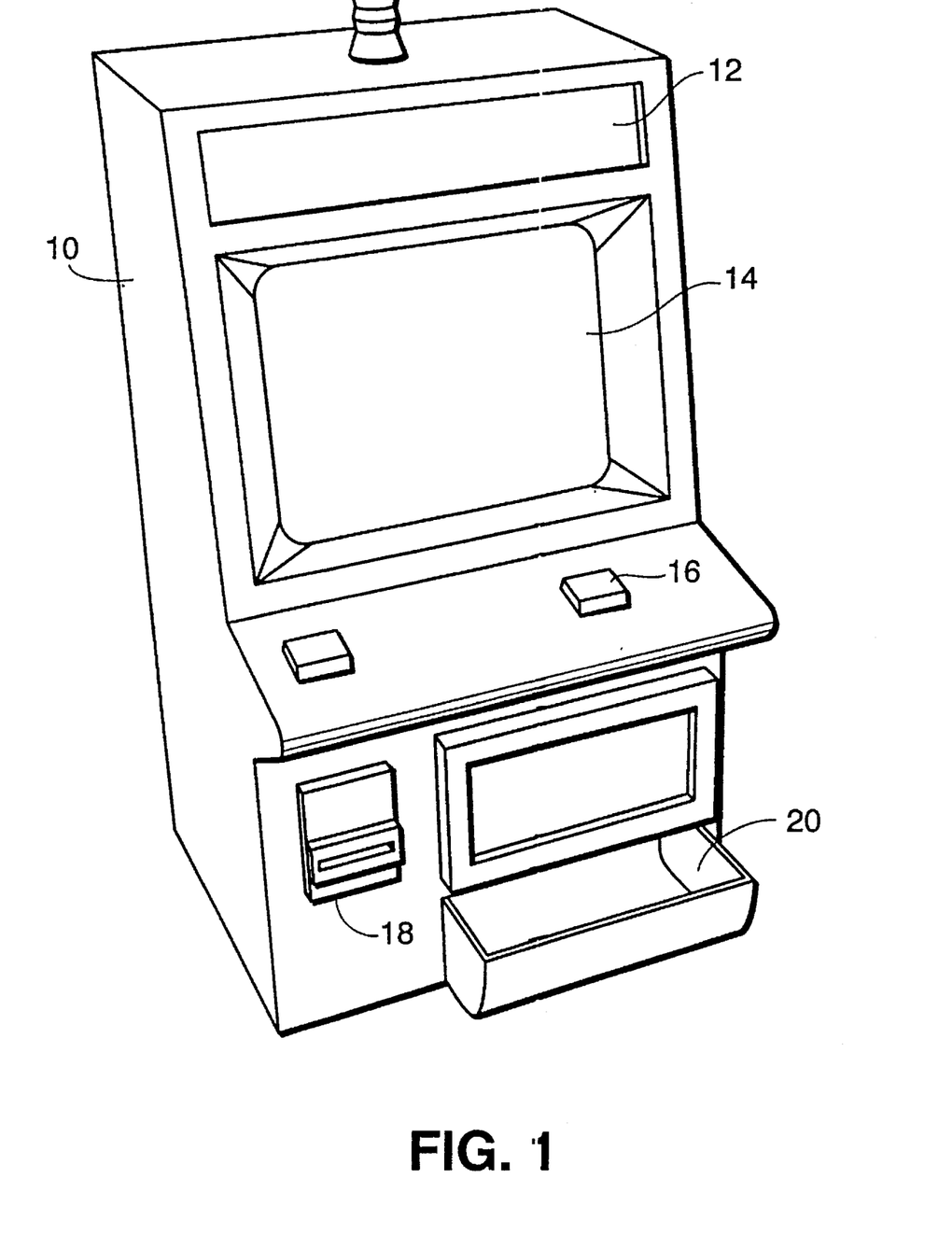
FIG. 1 is a perspective view of an apparatus constructed in accordance with and embodying the present invention.

Referring now in more detail and by reference characters to the drawings which illustrate a practical embodiment of the present invention, A designates one embodiment of a gaming apparatus comprised of an upstanding housing 10 having a front face 12 with a display screen 14 capable of generating a display of indicia, such as numbers or symbols, on Pull-Tab tickets, or other tickets or substrates, as hereinafter described. The first described embodiment of the invention uses a roll or an elongate strip of the tickets which are severed therefrom. This embodiment of the apparatus A also uses a raster pattern display screen for generating the indicia thereon.

The housing 10 is also provided with one or more manually actuable keys 16 which enable a user to actuate the apparatus, as hereinafter described. The keys represent various functions which the user may select and operate the keys according to the desired function or the desired mode of playing the game.

The gaming apparatus housing 10 is also provided with a money or currency receiver 18, which may be in the form of a coin exchanger for operating the apparatus with coins or in the form of a bill or paper currency reader. When the proper amount of money is introduced into the money receiver 18 the apparatus will be actuated to enable a play of a game and in accordance with actuation of the push button switches 16.

The money receiver 18 may be either coin operated or paper currency operated as aforesaid. In either case, these receivers are conventional in construction and therefore neither illustrated nor described in any further detail herein. However, it should be understood that the money receiver 18 is connected to a microprocessor (not shown) which is properly programmed to operate the apparatus. Thus, and in this case, when an appropriate amount of money has been received, an initiation signal will be sent to the microprocessor and the microprocessor will initiate an actuation signal permitting the apparatus to be operated.

Finally, the housing 10 is also provided with a discharge chute 20 for dispensing of Pull-Tab tickets or other type of gaming substrate segments and which are dispensed in accordance with the play of the gaming apparatus, as hereinafter described.

Figure 2:
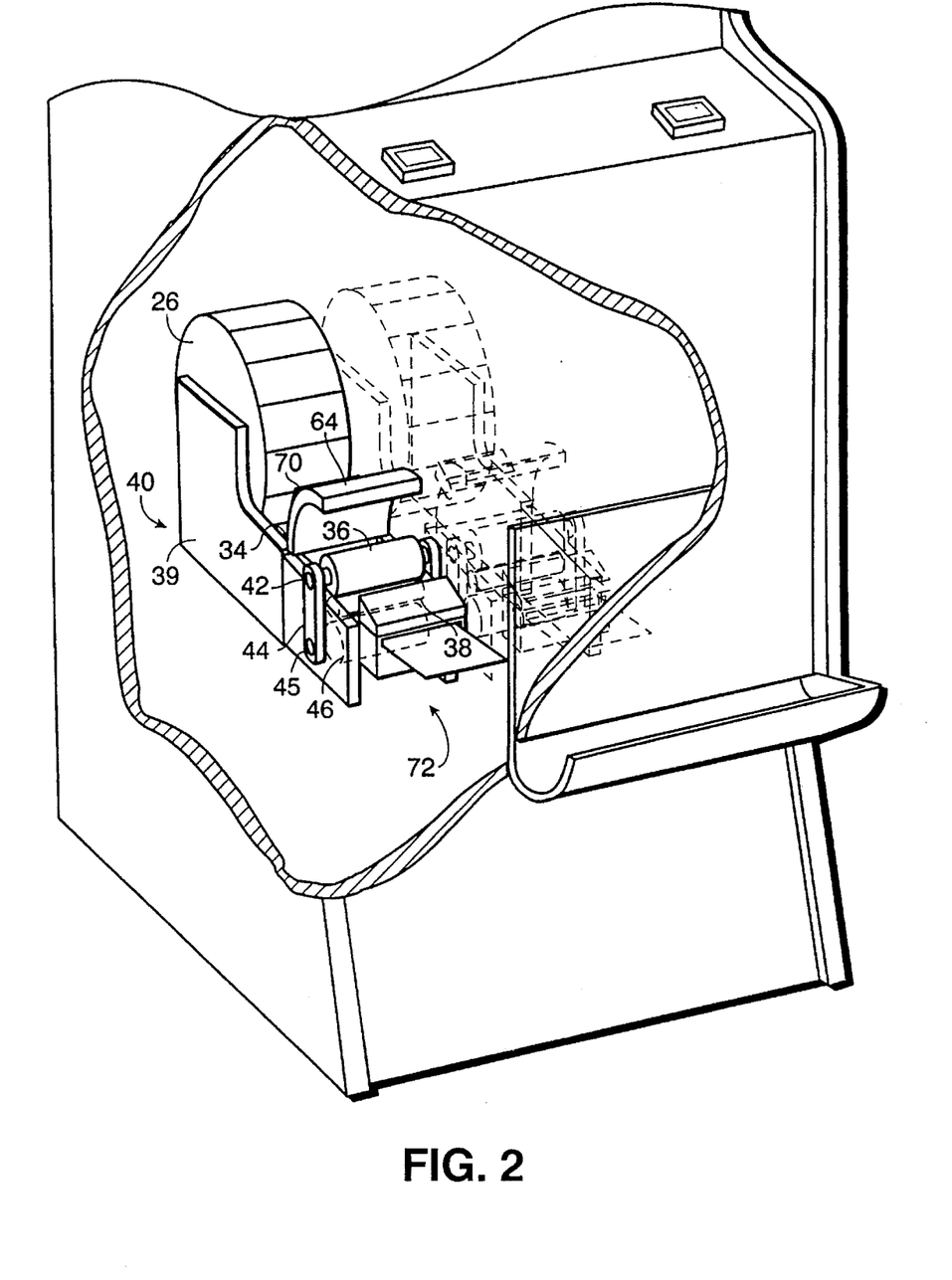
FIG. 2 is a fragmentary perspective view, partially broken away and in section, and showing the major interior components forming part of the apparatus of the invention for severing and dispensing a ticket.

By reference to FIG. 2, it can be observed that a ticket dispensing mechanism which forms part of the apparatus is more fully illustrated. In the preferred embodiment of the invention, it is only necessary to employ one complete ticket dispensing mechanism, as hereinafter described. However, it should be understood that a plurality of side-by-side separately actuable ticket dispensing mechanisms could be provided and adapted for either sequential play operation or for simultaneous play operation. In this way the user of the game apparatus may play only one of the play stations, or more than one station simultaneously, depending upon the proper actuation of the push-button switches 16 and upon deposit of the proper amount of money to play the desired number of play stations.

Referring again to FIG. 2, it can be observed that the major portions of the operating mechanism 24 of this apparatus are more fully illustrated. The apparatus comprises a supply spool 26 suitably mounted on a supply spool spindle 28. The supply spool 26 is provided with a primary strip 30 (see FIG. 5) in the form of a roll, and which may be dispensed from the supply spool. The primary strip 30 is formed of a substrate material which is usually a paper or thin paper-board material, but may effectively adopt any type of rollable or bendable material such as a thin plastic strip, plasticized paper strip, or the like.

Figure 3:
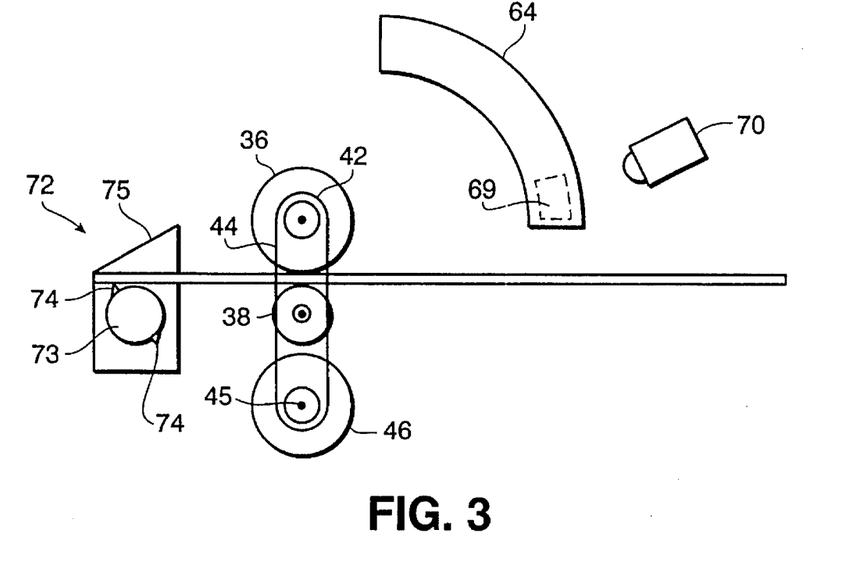
FIG. 3 is a schematic side elevational view showing a portion of the ticket dispensing mechanism forming part of the apparatus of the invention.
Figure 5:
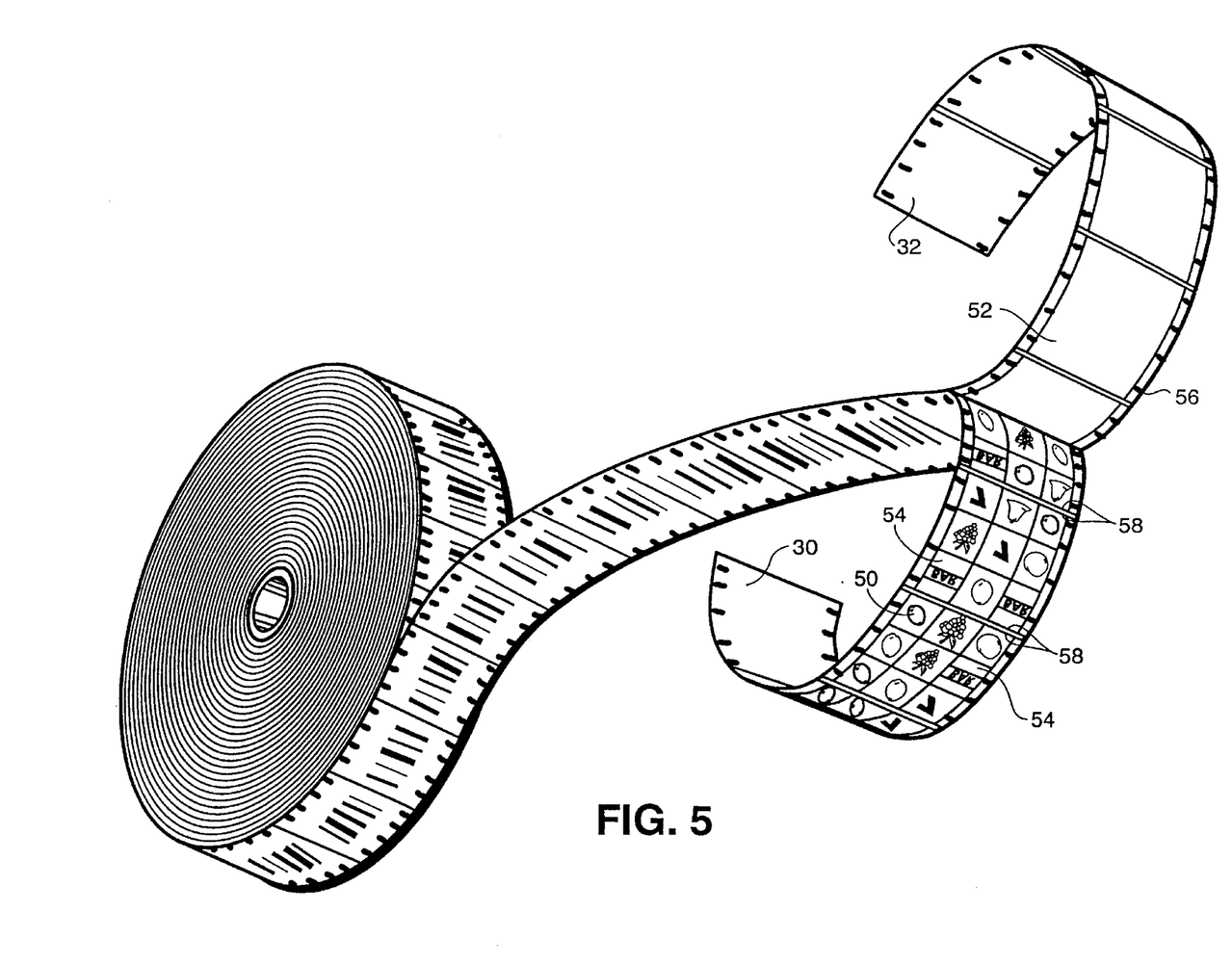
FIG. 5 is a perspective view of the primary and juxtaposed secondary strips.

The front face of the primary strip is disposed in facewise engagement with a marginally registered secondary strip 32 or so-called cover strip as shown in FIGS. 3 and 5. The supply spool 26 in the preferred embodiment is not power driven as such. Rather, a leader strip 34 of the sequentially formed tickets unwound from the roll is driven through a drive roller 36 and an idler roller 38 which are mounted on oppositely disposed face plates 39 forming part of a dispenser mechanism housing 40. The drive roller 36 is provided at one end with a sprocket 42 and is driven by means of a drive belt 44 trained around a drive sprocket 45 on a synchronous motor 46, all as best shown in FIGS. 2 and 3 of the drawings. In this way, the strip of sequential tickets is driven through the dispenser mechanism.

It should also be understood in accordance with the present invention that the spool 26 could also be driven and cause movement of a leader strip 34 of the individually severable tickets. In either case, and particularly in the embodiment as shown in FIGS. 2 and 3, the motor 45 would be actuated under the control of the microprocessor (not shown) upon proper insertion of the selected amount of money and actuation of any one of the manually actuable switches 16.

The microprocessor would be connected to the money receiver so as to initiate a proper energization signal, or actuation signal, when the proper amount of money has been received in the apparatus. This type of construction in which a money receiver is connected to a microprocessor to initiate actuation of an apparatus is known, as for example, in the gaming art industry.

The primary strip 30 is imprinted on its front or covered face with a plurality of indicia, such as indicia 50 which may be in the form of numbers, letters, graphic symbols, or the like. It can be seen, by reference to FIG. 5, that the indicia are each located in the individual indicia locations 54 on the primary strip 30. These indicia locations actually constitute discrete locations which are ultimately severed from the primary strip and constitute a ticket which is dispensed to the player of the apparatus. In the embodiment as illustrated, each indicia location 54 on the primary strip 30 is separated from the next adjacent indicia location by a pair of upper and lower horizontal lines 58. In actuality, it is not necessary for these lines to be printed on the substrate itself.

Each strip segment or ticket is equivalent to a pull-tab in the game of Pull-Tab. In the embodiment as illustrated, each strip segment or ticket is shown as being separated from the next adjacent strip segment on the strip by means of the black horizontal lines 58. In actuality, there may also be score lines at the location of each of these black upper and lower lines 58 which are printed on the substrate. Further, score lines are not necessarily required and do not have to exist as true perforations since the strip itself will be cut into the individual tickets or substrate sections in a manner to be hereinafter described in more detail. The primary strip 30 and the juxtaposed cover strip 32 lie in facewise contact with one another where the indicia on the front surface of the primary strip are in facewise contact with the cover strip 32. In this way, when the two strips are in such facewise contact, the indicia in each indicia location is essentially hidden from view.

The primary strip 30 and juxtaposed cover strip 32 are passed beneath a scanner housing 64 before entry between the drive roller 36 and the idler roller 38. In this particular arrangement, the rear face, that is, the exposed face of the primary strip 30, is disposed upwardly.

Figure 4:
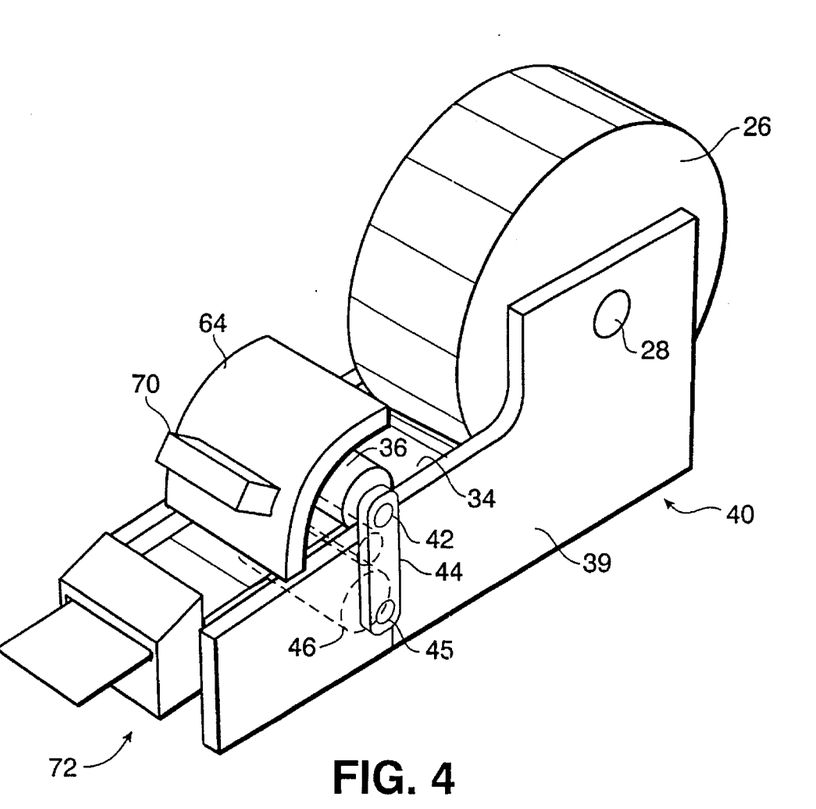
FIG. 4 is a perspective view showing a modified form of ticket dispensing mechanism.

The scanner housing 64 is constructed to contain a conventional scanning element 68, such as a charge-coupled diode. However, essentially any conventional scanning element may be employed. In like manner, if desired, a light source 70 could also be located in association with the scanner housing 64 for illuminating the exposed surface of the primary strip 30. As best shown in FIG. 4, the primary strip is then introduced into a cutting mechanism 72, as hereinafter described in more detail.

The rear surface of the primary strip 30 contains a bar code in each of the discrete separate locations, as shown in FIG. 5. Accordingly, there will appear on the rear surface of the primary strip 30 a separate bar code representative of the indicia on the opposite surface in each indicia location. In accordance with this arrangement, the rear face of the primary strip 30, and hence the bar code thereon, will be in readable position with respect to the scanner housing 64 and particularly the charge-couple diode 69. This bar code is not understandable and readily discernable by visual examination. However, when properly read and converted to corresponding indicia through the microprocessor, that indicia is in a form which can be displayed. Thus, the primary strip segment or ticket will have its own individual bar code corresponding to the indicia printed on the covered surface thereof.

The relationship between the indicia and the bar code may be recorded in a storage mechanism and which storage mechanism can form part of the microprocessor or can be connected to and accessible by the microprocessor. In any event, the microprocessor, upon recognizing the bar code, will determine the proper indicia for display. Thereafter, the indicia is displayed on the monitor 14. In this way, the user of the apparatus will receive a ticket as hereinafter described and will also be able to observe the indicia contained on that ticket on the display screen 14.

The cutting mechanism 72 can possibly be a conventional cutting mechanism of the type which is capable of severing a plastic or like sheet strip into individual segments. In the preferred embodiment of the invention, the cutting mechanism comprises a roller 73 having a pair of oppositely disposed cutting blades 74 and which are carved and angularly disposed relative to the central axis of the roller 73. Each blade 73 will initiate one complete cut of a ticket from the strip and thereafter the roller 73 will rotate to be in position for the next cutting operation by the oppositely disposed blade 74. Each of the blades 74 will bear against an anvil 75.

The cutting mechanism must be electrically operable so that it can be actuated under the control of the microprocessor to sever the strip at a proper location which constitutes an upper or lower margin of each strip segment location.

Upon energization of the cutting mechanism as, for example, by a solenoid (not shown), the roller 73 will be rotated and the blade will force the leader strip 34 into contact with the underside of the anvil 75 and thereby literally sever a strip segment or ticket from the remaining portion of the leader strip and thereby form a dispensable ticket. Therefore, upon receipt of a proper signal initiated through the microprocessor, the cutting mechanism 72 will be operated by the solenoid and sever the primary strip 30 into the individual strip segments or tickets. The tickets are thereupon allowed to deposit in the discharge chute 20 where they may be picked up by the player of the apparatus. The tickets can then be taken to a cashier or like individual for purposes of collecting the money if any of the tickets carries a winning indicia thereon.

The front face of the primary strip 30 which contains the indicia will actually be disposed in intimate facewise contact with the forward face of the cover strip 32. Thus, the indicia on the primary strip will not be initially observable until the player separates the cover strip from the primary strip. The rear and exposed face of the primary strip will contain the bar code 56, as aforesaid, and this bar code is only machine readable, that is, it cannot be intelligibly read by a user or observer of the apparatus. The indicia, therefore, will not be intelligible to the player or observer until the apparatus dispenses the ticket or displays the symbols corresponding to the bar code, or the user removes the cover strip from the primary strip, or both.

FIG. 4 illustrates a slightly modified form of ticket dispensing mechanism which is similar in construction and operation to the ticket dispensing mechanism illustrated in FIG. 2. In this embodiment of the invention, the only difference between the ticket dispensing mechanism of FIG. 4 is that the position of the scanner is reversed with respect to that shown in FIG. 2. In the embodiment as shown in FIG. 4, the scanner is located immediately adjacent to, but before the ticket cutter 72 with respect to the path of movement of the tickets. In this position, the scanner will only read the tickets at the last possible moment before dispensing. Thus, and in this embodiment, the ticket is actually not read until the very last minute prior to dispensing thereof.

Figures 6, 7, 8, 9, 10:
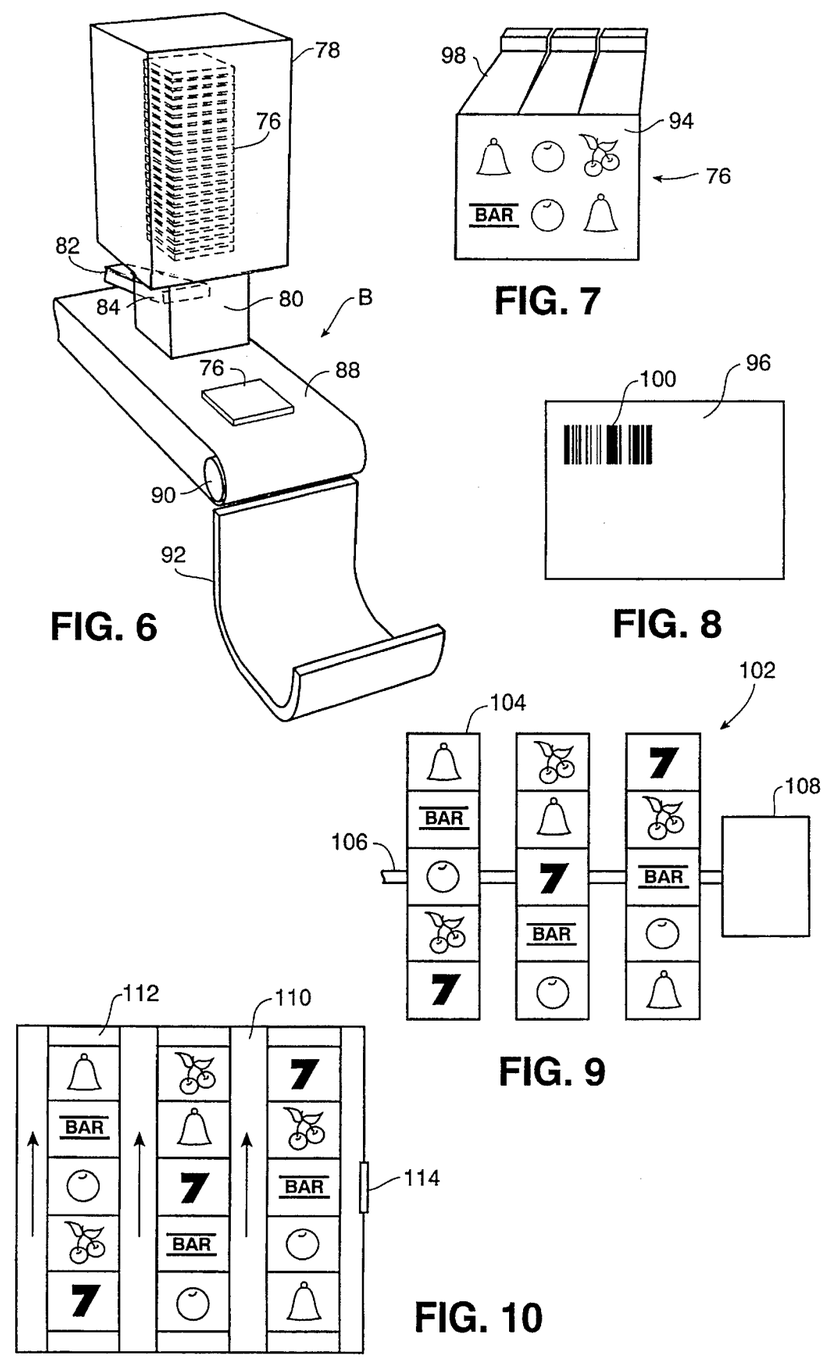
FIG. 6 is a fragmentary perspective view of the modified form of gaming apparatus which is capable of dispensing individual tickets from the apparatus upon actuation thereof.
FIG. 7 is a front elevational view of one form of ticket used in the gaming apparatus of FIG. 6.
FIG. 8 is a rear elevational view of the gaming ticket used in the apparatus of FIG. 6.
FIG. 9 is a fragmentary elevational view showing a mechanism for using spinning wheels in the display of the present invention.
FIG. 10 is a front elevational view of a gaming apparatus in accordance with the present invention which uses a raster pattern display member.

FIG. 6 illustrates a slightly modified form of electronic gaming apparatus B and which is used for the dispensing of discrete tickets 76, the latter of which is best illustrated in FIGS. 7 and 8 of the drawings. The gaming apparatus B is similar in construction to the gaming apparatus A except that the gaming apparatus B utilizes a hopper 78 containing the discrete tickets 76. In this case, the hopper 78 would be provided with means for maintaining the discrete tickets 76 in a stack such as that shown. The lower end of the hopper 78 is provided with a discharge mechanism 80 and which operates by either an electrical signal or by means of a mechanical coupling, such as the rod 82, as shown in FIG. 6. The rod 82 or otherwise an electrical signal operating in conjunction with a solenoid (not shown) would operate a discharge plate 84 in the discharge mechanism 80 to allow a discharge of a discrete ticket 76.

Each discrete ticket 76 is deposited on a conveyor belt 88 trained about drums 90 and one of which is a powered drum for rotation. The conveyor belt 88 terminates at a discharge tray 92 in which the discrete ticket 76 is dropped for collecting by a player of the game apparatus.

Each of the discrete tickets 76 is more fully illustrated in FIGS. 7 and 8, as aforesaid, and comprises a front face 94 and a rear face 96. The front face includes the indicia thereon as shown in FIG. 7. Moreover, the indicia is covered by a removable cover 98. The removable cover 98 is designed so that once removed, it is not readily replaceable and is capable of being discarded.

The rear face 96 of the discrete tickets 76 is provided with a bar code 100, as best shown in FIG. 8. It should be understood that this bar code could actually be included on the front face 94, or for that matter on the cover strip, if desired. However, it has been found to be preferable to provide the bar code on the rear face. Furthermore, the reading mechanism in this case could be located immediately at the lower end of the discharge mechanism 80 so as to read the bar code on the rear face of the discrete ticket 76.

FIG. 9 illustrates one form of display mechanism 102 of the present invention. This display mechanism 102 uses a plurality of rotating wheels 104 in which the indicia is printed on an annular peripheral face thereof, as shown. Each of these rotating wheels 104 are rotatable with respect to a shaft 106. In this case, the shaft 106 could actually constitute a plurality of concentric shafts with each disk or rotating reel 104 mounted on a separate one of the shafts. The shaft 106 or otherwise the shaft arrangement 106 is operated by a drive mechanism 108. This drive mechanism is conventional and therefore neither illustrated nor described in any detail herein. However, the drive mechanism 108 could be precisely that drive mechanism used for rotating the wheels in the so-called "slot machine" gaming apparatus.

FIG. 10 illustrates an embodiment of the invention using a raster pattern display screen 110. In this case, three rows of indicia are shown. Generally, the display will cause the various columns 112 of the indicia to rotate, as for example, in the direction as shown by the arrows in FIG. 10. In other words, the indicia are moved upwardly across the screen from the lower edge thereof to the upper edge, and in such manner as to generate an appearance of a rotating reel. Each of these columns of indicia will stop moving so that a selected row of indicia on the ticket will be shown at the position designated as 114, usually a row midway between the upper and lower edges of the display screen 110. All three columns of indicia will have the selected indicia within this defined row location 114.

Also in accordance with the present invention, as the indicia move upwardly across the screen, one column of indicia will not be coordinated with the next column of indicia in a fixed time relationship, that is, they will not move in coordinated horizontal rows. Actually, the first or left-hand row of indicia will first start to rotate, followed by the middle column of indicia and then followed by the right-hand column of indicia. Thereafter, the first column of indicia will stop, followed shortly thereafter by the second column of indicia, and then followed shortly thereafter by the third column of indicia. This will create an illusion as though there are actually spinning wheels behind the display member.

The present invention is provided with an indicia control means which is associated with or forms part of a microprocessor used for generating the display. In this respect, the electronic switch which is involved in generating the display is quite simple. These electronics are more fully illustrated in FIG. 12. The initial determination of whether a ticket constitutes a winning ticket, whether or not it is a discrete ticket or separated from a large strip, is performed by a scanner, such as the conventional scanning element 68. This scanner 68 is capable of reading the bar code or other type of code which may be imprinted on the ticket or a secondary strip associated with the ticket, as aforesaid. For the purposes of this invention, when a code is described as being imprinted on the ticket, it will also be understood that it may as well be on the secondary strip associated with that ticket.

In any event, after the code is read by the scanner 68, the code is introduced into a microprocessor 120 which is effectively the heart of the electronic control system of the invention. This microprocessor 120 operates the ticket dispensing mechanism represented in this FIG. 11 as 122. However, it should be understood that the term "ticket dispensing mechanism" will constitute those portions of the apparatus which cause the strip to be moved and a segment severed from the strip and dispensed if the ticket is derived from a strip of the tickets. In like manner, the ticket dispensing mechanism may constitute that mechanism for dispensing precut individual tickets, as previously described.

Figure 11:
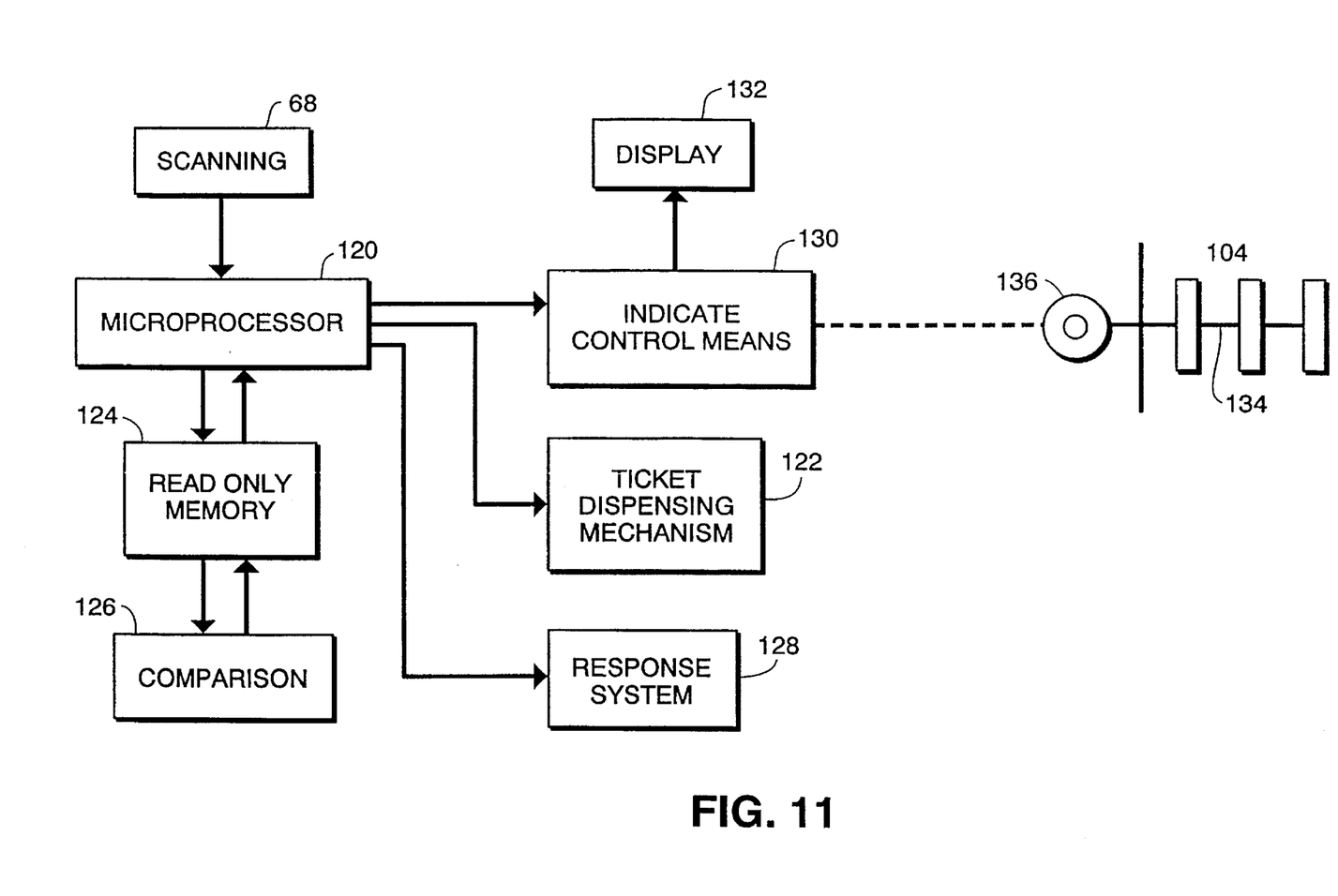
FIG. 11 is a schematic electrical circuit forming part of the apparatus of the present invention.

The microprocessor operates in conjunction with a read-only memory 124 which may contain the program of the actual correct winning indicia. This read-only memory 124 would operate in conjunction with a comparator 126 in order to determine if the ticket which is dispensed is a winning or scoring ticket. In place of the read-only memory 124 and the comparator 126, it is also possible to use an appropriately programmed random access memory (not shown). Thus, the microprocessor 120 will be alerted as to whether or not the dispensed ticket is a winning ticket. If so, the microprocessor can cause a response system 128 to operate. Here again, the response system is designated schematically and could represent, for example, bells or sirens or blinking or flashing lights, or the like. The exact type of response system is not critical in accordance with the present invention and is therefore neither illustrated nor described in any further detail herein. However, it should be understood that this response system could operate much in the same manner as a response system used on conventional slot machine gaming apparatus.

The microprocessor 120 also operates an indicia control means 130 which may form part of the microprocessor 120, or it may be operated under control of the microprocessor 120. The indicia control means causes a display of indicia on a display member 132 which may constitute either the spinning reels or the display screen. In this case, the display member 132 represents a raster pattern display screen. The indicia control means 130 will cause the monitor, such as the display screen 132, to generate images, such as the icons or other indicia, scrolling across the display screen, much in the same manner as they appear on spinning reels or disks. Again, this indicia control means will cause the display to generate this pattern under the control of the microprocessor 124.

FIG. 11 also alternatively illustrates the operation of a plurality of individual disks or wheels, such as those disks 104. However, each of the individual disks are mounted on a shaft assembly 134 which is under the control of one or more synchronous electric motors 136. Again, the connection of the shaft assembly 134 to the synchronous motor or motors 136 is only schematically illustrated, inasmuch as the exact construction is conventional and is therefore neither illustrated nor described in any further detail herein. Nevertheless, the synchronous motor or motors 136 would cause the reels or disks to rotate, much in the same manner as the wheels or disks would rotate in a conventional slot machine gaming apparatus.

The gaming apparatus and method of the present invention are highly effective in simulating or otherwise automating the conventional game of Pull-Tab, as aforesaid. In this case, and in a conventional Pull-Tab game, the player removes the opaque cover sheet on the tap so that he or she can examine the indicia to thereby determine if that player was or was not a winner. In the game apparatus of the present invention, essentially the same operation is taking place. However, rather than having a dealer select a Pull-Tab or ticket in a random location from a box of like tabs, the apparatus of the invention literally dispenses the next randomly located Pull-Tab or discrete ticket. No player, or any other party operating the machine or anyone else, for that matter, will know what indicia is contained on the ticket dispensed to the player until that indicia is either displayed or read from the ticket, or both.

In one of the important aspects of the invention, a method of distribution of the gaming tickets is provided such that each player of the gaming apparatus, which playing this pull-tab game, will play against each other player, as opposed to the gaming apparatus itself. In a true Class III gaming apparatus, the player effectively plays against the apparatus in that some means associated with that apparatus will determine whether or not the player receives winning indicia. In the case of a roulette table, the spinning of a disk and cessation of disk rotation at a certain location determines whether or not a player wins or loses. In slot machine gaming activity, randomly rotating wheels which stop at certain positions or a display depicting randomly rotating wheels operated by a random generator will determine whether or not a player wins or scores in a gaming activity.

In the present invention, the apparatus is actually passive, as opposed to active and does not determine the fate or outcome of a particular game or play. In this case, the gaming apparatus is passive in that it only dispenses a ticket which will determine whether or not the player wins the game, and in addition may display the results appearing on that ticket. Thus, if the ticket is dispensed from a roll or a stack of tickets, the actual location in that roll or that stack of tickets will effectively determine when and if a player receives a winning or a scoring ticket.

In accordance with the present invention, the distributor of the tickets, as for example, rolls of the tickets, will furnish a preselected number of rolls, e.g. one hundred rolls to a particular gaming location. Those rolls of tickets are then installed in the gaming apparatus and when a supply of tickets in one gaming apparatus is used, an additional roll from this predetermined lot of tickets, e.g. one hundred rolls is installed in that gaming apparatus. Each of the rolls contain the same predetermined number of tickets, e.g. seven hundred and fifty tickets. However, among the seven hundred and fifty tickets in each of the one hundred rolls, in this particular example, only a limited number of the tickets have winning indicia, e.g. twenty five tickets. Moreover, those twenty five tickets are truly randomly disbursed throughout the seven hundred and fifty tickets on each roll among the one hundred rolls. Thus, it is theoretically possible for all twenty five winning tickets to appear on one roll or to be randomly disbursed throughout the one hundred rolls. Moreover, there is essentially no way of determining where that particular winning ticket or winning tickets in any roll may be located in the roll. Inasmuch as the tickets are truly randomly generated, although the exact number of winning tickets is controlled, there is essentially no control over where those tickets will appear in the rolls, and on which rolls they will appear.

In accordance with this procedure each gaming location is guaranteed to have so many winners. Some tickets may generate large wins and other tickets may provide lesser wins providing a lower reward, e.g. a lower payout. Moreover, and more importantly, each player of the game effectively plays against every other winner. In this way, the player does not actually play against the apparatus since the apparatus is passive and primarily dispenses the tickets. Rather, the player of the gaming apparatus actually plays against every other player. This particular method of distribution is unique in that it enables each player to play against every other player with a passive machine, as opposed to playing against the machine where the machine takes an active participating role in the play of the activity.

Figure 12:
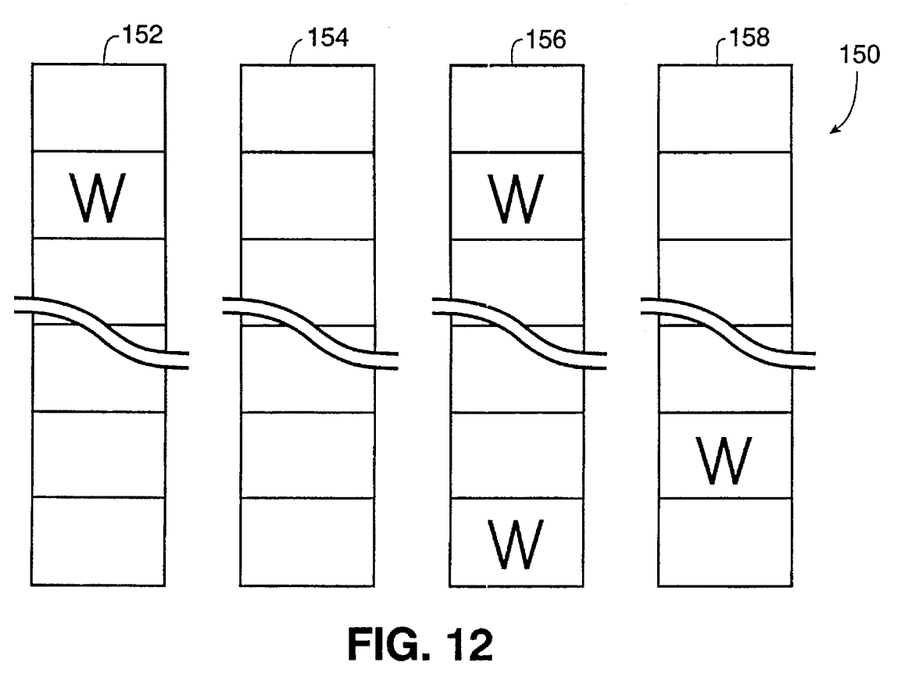
FIG. 12 is a schematic view showing a plurality of rolls of tickets with certain of the tickets containing winning indicia thereon and the random distribution thereof among the rolls.

FIG. 12 illustrates a simple example of how a group of tickets or a so-called "lot" 150 may be arranged with winning tickets. In this case, segments of four rolls of tickets have been illustrated. Those tickets which contain the winning indicia are designated with the letter W as opposed to the icons which would normally appear on those tickets. In this case, the four rolls may be representative of the lot 150 of one hundred such rolls. Further, and in the example previously described, each roll would have seven hundred fifty tickets. In the simple embodiment as shown in FIG. 12, it can be seen that winning tickets are disbursed throughout the roll. Thus, in one roll 152 there is one winning ticket in the second location and in the second roll 154 there are no winning tickets. The third roll 156 contains two winning tickets and the fourth roll 158 contains only one winning ticket. Thus, it can be seen that the winning tickets are randomly disbursed throughout the various rolls.

Inasmuch as each of the rolls, or for that matter stacks of tickets, are prepared by a random ticket generator which is used in preparation of the rolls or stacks of tickets, and moreover, since each of the winning tickets are covered by a cover strip, no one knows where the winning tickets will be located. Indeed, since there is a true random generator which operates in the printing of the tickets, it is known that maybe twenty five tickets will constitute winning tickets, but essentially no one knows where those tickets are in each roll and in which roll those tickets may appear. Consequently, each player effectively is playing against all other players of the game. This is important in that it actually increases participation in the play of the game. It also allows for the play of a Class II game since the player does not rely upon the apparatus to determine the outcome of any particular play. As indicated previously, the apparatus itself is actually passive in that it only dispenses the ticket. However, and as also indicated above, if the player does win a winning indicia, the apparatus can be constructed so as to provide a response similar to a Class III gaming apparatus.

Thus, there has been illustrated and described a unique and novel electronic gaming apparatus and a method of use therefor which fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I claim is:

1. An electronic gaming apparatus capable of dispensing an individual ticket containing indicia thereon upon actuating the apparatus and where the ticket is removed from a large group of such tickets which contain indicia thereon and where only certain of the tickets contain winning or scoring indicia thereon, said apparatus comprising:

a) a means for dispensing a ticket containing indicia from the large group thereof upon actuation of the apparatus;

b) means for utilizing a code from the ticket to determine the indicia;

c) a display means on said apparatus displaying indicia corrected to that on the ticket; and d) indicia control means associated with the means for utilizing a code and the display means for causing the indicia to be moved across the display means and selectively stopped at selected positions so that the player of the gaming apparatus observes an image of rotating wheels which display the indicia at the display means.

2. The electronic gaming apparatus of claim 1 further characterized in that the display means comprises a raster pattern screen and the image of the rotating wheels is simulated on the screen.

3. The electronic gaming apparatus of claim 1 further characterized in that said indicia control means causes each of the indicia to be moved vertically across the display means and selectively and successively stopped at fixed positions on the display means.

4. The electronic gaming apparatus of claim 1 further characterized in that image indicia control means causes each of the indicia to be moved vertically across the display means and selectively and successively stopped at the same fixed horizontal position on the display means.

5. The electronic gaming apparatus of claim 1 further characterized in that the means for dispensing a ticket comprises severing the ticket from a strip of the tickets and where all tickets in the group are contained on the strip.

6. The electronic gaming apparatus of claim 1 further characterized in that the apparatus further comprises:
 a) a primary strip containing indicia thereon;
 b) a cover strip over the indicia on said primary strip; and
 c) means for severing a segment of the primary strip and cover strip to constitute and provide said ticket and dispensing same upon actuation of the apparatus.

7. The electronic gaming apparatus of claim 1 further characterized in that the means for utilizing the code is a reading means which reads a code on the ticket.

8. The electronic gaming apparatus of claim 7 further characterized in that the code is one which is only machine readable and which code is used to generate the display.

9. The electronic gaming apparatus of claim 1 further characterized in that the means associated with the display means for causing generation of the indicia comprises a reading means which reads the code on the ticket and a processing means operates in conjunction therewith.

10. An electronic gaming apparatus capable of dispensing an individual ticket containing indicia thereon upon actuating the apparatus and where the ticket is dispensed from a large group of such tickets which contain indicia thereon and where only certain of the tickets may contain winning or scoring indicia thereon, said apparatus comprising:
 a) means for dispensing a ticket containing indicia from the large group thereof upon actuation of the apparatus;
 b) display means on said apparatus for displaying the indicia on the tickets; and
 c) means for causing each of a plurality of indicia corresponding to the indicia on a ticket to move generally vertically across the display means and where each of the indicia corresponding to those on the ticket will selectively stop at at least one selected horizontal row on the display means.

11. The electronic gaming apparatus of claim 10 further characterized in that each of the indicia corresponding to those on the ticket will selectively and successively stop at one or more fixed horizontal rows on the display means.

12. The electronic gaming apparatus of claim 10 further characterized:
 a) each of said tickets have a code thereon which is machine readable and not readily discernable by visual examination; and
 b) means is located in said apparatus for reading the code corresponding to the indicia of the ticket which is being dispensed.

13. The electronic gaming apparatus of claim 10 further characterized in that the ticket used in said apparatus further comprises;
 a) a primary strip containing indicia thereon;
 b) a cover strip over the indicia on said primary strip; and said apparatus comprises:
 c) means for severing a segment of the primary strip and cover strip to constitute and provide said ticket and dispensing same upon actuation of the apparatus.

14. A method of playing an electronic gaming apparatus which dispenses an individual ticket containing indicia thereon upon actuating the apparatus and where the ticket is removed from a large group of such tickets which contain indicia thereon and where only certain of the tickets may contain winning or scoring indicia thereon, said apparatus comprising:
 a) actuating the gaming apparatus;
 b) dispensing a ticket containing indicia from the large group thereof upon actuation of the apparatus;
 c) determining if the indicia was a winning or scoring indicia; and
 d) causing representations of the indicia on the ticket to be moved across a display means and selectively stopped at fixed scoring positions in such manner that the player of the gaming apparatus observes an image of rotating wheels which display the indicia.

15. The method of playing an electronic gaming apparatus of claim 14 further characterized in that the method comprises simulating an image of the rotating wheels on the display screen.

16. The method of playing an electronic gaming apparatus of claim 14 further characterized in that the method comprises rotating a plurality of rotating wheels which have the indicia imprinted on annular surfaces thereof.

17. The method of playing an electronic gaming apparatus of claim 14 further characterized in that the method comprises causing each of the indicia to be moved vertically across the display screen and selectively and successively stopped at selected fixed horizontal positions on the display screen.

18. A method of distributing a lot of tickets for use with a plurality of similar gaming apparatus and where each of the tickets contain indicia but only a limited number of such tickets contain winning indicia in such manner that each player of one of the gaming apparatus using the tickets effectively plays that gaming apparatus against each of the other players, said method comprising:
 a) preparing a lot of tickets with each ticket having indicia thereon and with only a certain limited number of the tickets in that lot containing winning or scoring indicia;
 b) dividing the lot of tickets into individual groups such that there are a plurality of groups of the tickets with each group containing a plurality of tickets and where the tickets having the winning or scoring indicia are randomly distributed throughout the groups of tickets and amongst the tickets in certain of these groups;
 c) providing each of the groups of tickets in a lot to a particular gaming establishment such that all tickets in that lot will be played in the plurality of gaming apparatus in that gaming establishment and where each player of a gaming apparatus containing those tickets effectively plays against each of the other players of the gaming apparatus containing that lot of tickets.

19. The method of claim 18 further characterized in that the method comprises locating a cover strip over each ticket to preclude observation of indicia on that ticket prior to dispensing thereof.

20. The method of claim 18 further characterized in that each of the tickets in a group constitute a roll of the tickets and each lot constitutes a plurality of rolls.

21. The method of claim 18 further characterized in that the tickets in each group of the tickets constitutes a stack of precut tickets.

22. An electronic gaming apparatus capable of dispensing gaming tickets containing indicia thereon upon actuating the apparatus and where the tickets are served from an elongate strip of such tickets and indicia on certain of the gaming tickets represent winning indicia, said apparatus comprising:

a) frame means defining a ticket movement path;

b) drive means for moving an elongate strip of the tickets in the ticket movement path;

c) severing means after the drive means in the direction of movement of the strip of tickets for serving an endmost ticket from the strip in the ticket movement path; and d) means for dispensing the served ticket after the severing means and upon actuation of the apparatus such that the ticket containing strip in effecting pushed through the ticket movement path.

23. The electronic gaming apparatus of claim 22 further characterized in that a processing means is located after the drive means in the direction of the movement of the tickets in the ticket movement path for reading the tickets or information relating to one or move of the tickets.

24. The electronic gaming apparatus of claim 23 further characterized in that the processing means is located in closely spaced relationship to the severing means.

25. The electronic gaming apparatus of claim 23 further characterized in that the processing means comprises a scanning means for scanning and machine readable code associated with a dispensed ticket.

26. The electronic gaming apparatus of claim 25 further characterized in that the code is on said ticket and is a bar code read by the scanning means and which is not readily discernable by visual examination.

27. The electronic gaming apparatus of claim 26 further characterized in that the aperture comprises means for displaying information relating to indicia generated from the code on the ticket which is dispensed.

28. The electronic gaming apparatus of claim 22 further characterized in that each said ticket on the strip comprises:

a) a ticket substrate having a first surface and an oppositely disposed second surface;

b) indica used in the play of the game on the first surface of said ticket; and c) an opaque cover strip disposed over the indicia precluding view of the indicia until removal of the cover strip.

29. The electronic gaming apparatus of claim 22 further characterized in that the drive means comprises a drive roller and an engaging pinch roller which engages the strip therebetween.

30. A method of operating a game of chance having a strip of tickets and where a ticket is served from the strip and dispensed upon actuation of a gaming apparatus playing the game of chance and issuing tickets from the strip of tickets; said method comprising:

a) actuating the gaming apparatus to cause movement of the strip containing a plurality of tickets in a ticket movement path with each ticket containing indicia thereon and only a limited number of tickets containing winning indicia thereon;

b) driving the ticket at a drive station through the ticket movement path of the apparatus for ultimate dispensing thereof;

c) severing the ticket from the strip in the ticket movement path subsequent to the driving of the ticket through the path such that the ticket is effectively pushed through the ticket movement path; and d) dispensing the selected discrete ticket having the indicia thereon to the player of the apparatus.

31. The method of claim 30 further characterized in that the method comprises scanning a machine readable code on the ticket by the apparatus after the ticket reaches the drive station.

32. The method of claim 31 further characterized in that the method comprises displaying on a display screen on the apparatus indicia corresponding to that on the ticket.

33. The method of claim 30 further characterized in that each ticket contains indicia and where the player will win a game if the indicia on the ticket corresponds to winning indicia.

34. An electronic gaming apparatus capable of dispensing a ticket containing indicia thereon used in the play of a game of chance upon actuating the apparatus and dispensing a ticket containing indicia thereon and a machine readable code correlated to the indicia on the dispensed ticket, said apparatus comprising:

a) a ticket movement path in the apparatus capable of enabling movement of a ticket to be dispensed;

b) scanning means at the ticket movement path for scanning the machine readable code of each ticket which is dispensed;

c) a dispensing member enabling the dispensing of a ticket in the ticket movement path immediately after scanning the machine readable code so that the gaming apparatus does not effectively recognize whether the dispensed ticket contains winning or scoring indicia substantially before the ticket is dispensed; and d) display means connected to said scanning means for displaying information correlated to the indicia on the dispensed ticket.

35. The electronic gaming apparatus of claim 34 further characterized in that machine readable code on the ticket corresponds directly to the indicia on the ticket and where the information contained in said machine readable code is not readily discernable by visual examination.

36. The electronic gaming apparatus of claim 35 further characterized in that the display means will display indicia corresponding to that on the dispensed ticket.

37. The electronic gaming apparatus of claim 36 further characterized in that the apparatus comprises advancing means at the ticket movement path for moving a ticket through the apparatus.

38. The electronic gaming apparatus of claim 37 further characterized in that said advancing means is connected to a money receipt mechanism and is actuated only when a selected amount of money is deposited in the apparatus.

39. The electronic gaming apparatus of claim 38 further characterized in that the advancing means comprises a positive drive means in advance of the scanning means in the direction of movement of the ticket in the ticket movement path.

40. The electronic gaming apparatus of claim 39 further characterized in that the drive means effectively pushes the ticket through the ticket movement path.

41. The electronic gaming apparatus of claim 40 further characterized in that each of said tickets is a segment of a large strip containing a number of such tickets and that said apparatus comprises a cutting means which cuts the ticket from the strip after actuation of the apparatus and which is immediately adjacent the discharge member and scanning means.

42. The electronic gaming apparatus of claim 41 further characterized in that the scanning means is located immediately adjacent to the dispensing member.

43. The electronic gaming apparatus of claim 34 further characterized in that the gaming apparatus aids in the game of Pull-Tab and each dispensed ticket constitutes a separate Pull-Tab.

44. A method of playing a game of chance where a player obtains a ticket containing indicia and in which the player will win a game if the indicia on the ticket corresponds to winning indicia, said method comprises:

a) actuating an apparatus containing a plurality of tickets with each ticket containing indicia thereon and only a limited number of the tickets may contain winning indicia thereon;

b) scanning a machine readable code on the ticket and which code is correlated to the indicia on the ticket;

c) dispensing the selected ticket having indicia thereon to the player of the apparatus immediately after scanning the machine readable code so that apparatus does not effectively recognize whether the ticket is a winning or scoring ticket substantially before it is dispensed to the player; and d) displaying on a display screen on the apparatus information correlated to the indicia on the ticket which is dispensed.

45. The method of claim 44 further characterized in that the method comprises advancing the ticket through the apparatus along with a cover strip disposed in juxtaposed relation to the indicia on the ticket.

46. The method of claim 45 further characterized in that the method comprises dispensing the ticket with the cover strip in place over the indicia.

* * * * *